(12) United States Patent
Baker et al.

(10) Patent No.: US 7,164,660 B2
(45) Date of Patent: Jan. 16, 2007

(54) RADIO COMMUNICATION SYSTEM AND METHOD OF OPERATING THE SYSTEM

(75) Inventors: Matthew P. J. Baker, Canterbury (GB); Timothy J. Moulsley, Caterham (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 963 days.

(21) Appl. No.: 09/825,276

(22) Filed: Apr. 3, 2001

(65) Prior Publication Data

US 2001/0038619 A1    Nov. 8, 2001

(30) Foreign Application Priority Data

Apr. 7, 2000    (GB)    ................... 0008488.9

(51) Int. Cl.
*H04B 7/185*    (2006.01)
(52) U.S. Cl. ................... 370/318; 370/320; 370/342
(58) Field of Classification Search ................ 370/310, 370/315, 320, 335, 342, 318
See application file for complete search history.

(56) References Cited

U.S. PATENT DOCUMENTS

| | | | |
|---|---|---|---|
| 5,465,399 A * | 11/1995 | Oberholtzer et al. | 455/69 |
| 5,564,075 A | 10/1996 | Gourgue | 455/69 |
| 5,825,761 A | 10/1998 | Tanaka et al. | 370/333 |
| 5,920,287 A * | 7/1999 | Belcher et al. | 342/450 |
| 6,249,515 B1 * | 6/2001 | Kim et al. | 370/337 |
| 6,434,365 B1 * | 8/2002 | Knutson et al. | 455/69 |
| 2005/0239491 A1 * | 10/2005 | Feder et al. | 455/522 |

FOREIGN PATENT DOCUMENTS

| | | |
|---|---|---|
| DE | 19843982 A | 4/2000 |
| EP | 0913957 A1 | 5/1999 |
| WO | WO0008706 | 2/2000 |

* cited by examiner

*Primary Examiner*—Huy D. Vu
*Assistant Examiner*—Jason Mattis

(57) ABSTRACT

A radio communication system comprises a primary station (100) for transmitting information signals on a downlink channel (122) and for receiving signals from one or more secondary stations (110) on an uplink random access packet channel (RACH) (124), the downlink and uplink channels being independent of each other. Power control is applied to the transmitted downlink signals by at least one of the secondary stations transmitting indicia indicating the prevailing radio channel characteristics of the uplink channel, the indicia being used by the primary station to apply power control to the downlink signals.

If the uplink signals are CDMA signals the indicia may comprise a timing offset which has a value related to the quantity to be signalled.

14 Claims, 2 Drawing Sheets

RADIO COMMUNICATION SYSTEM AND METHOD OF OPERATING THE SYSTEM

The present invention relates to a radio communication system having a downlink forward access control channel (FACH) for transmissions by a primary station to one or more secondary stations and an uplink random access channel for transmissions from at least one of the secondary stations to the primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access packet channel refers to the logical channel on which random access packet transmissions take place, which would typically consist of a number of distinct physical channels.

In CDMA systems such as UMTS, power control is important in order to minimise the interference caused to other transmissions while maintaining an acceptable error rate on the transmission in question.

The initial transmit power of a new transmission can be set to give approximately the desired signal to interference ratio (SIR) at the receiver if the approximate path loss of the radio channel (and preferably interference levels at the receiver) are known. The path loss and interference can be considered characteristics of the radio channel.

This is used for example in setting the initial transmit power of uplink dedicated channels (DCHs) in UMTS frequency division duplex (FDD) mode. In this case, the transmit power of the downlink Common Pilot Channel (CPICH) is notified to the secondary stations (referred in UMTS as user equipments UEs), which then measure the received power and use these two values to calculate the approximate downlink path loss. This is assumed to give an approximate estimate of the uplink path loss, which enables a new uplink transmission to be commenced at a power which is a suitable function of the estimated uplink path loss.

In the UMTS specifications, the Forward Access Channel (FACH) is an example of a common downlink channel which is used for conveying information including signalling information to UEs. However, it is not currently possible for the initial transmit power of the FACH to be set appropriately for the path loss as there is no continuous uplink channel for the primary station to measure, nor is there a suitable uplink channel defined for notifying the downlink path loss or UE's transmit power to the primary station.

An object of the present invention is to control the initial transmit power and/or bit rate of a primary station on a downlink channel which has no complementary uplink channel.

According to a first aspect of the present invention there is provided a method of operating a radio communication system having a downlink channel for transmissions by a primary station to one or more secondary stations and an uplink random access channel for transmissions from the or each secondary station to the primary station, the method comprising the secondary station transmitting an uplink signal on the random access channel giving an indication of the radio channel characteristics, and the primary station transmitting a signal on the downlink channel at a power level and/or bit rate which takes into account the indicated radio channel characteristics.

According to a second aspect of the present invention there is provided a method of operating a radio communication system having a downlink channel for transmissions by a primary station to one or more secondary stations and an uplink random access channel for transmissions from the or each secondary station to the primary station, the method comprising the secondary station transmitting an uplink signal on the random access channel, which uplink signal can be used by the primary station to determine the prevailing radio channel characteristics of the random access channel, the primary station in response to determining the radio channel characteristics transmitting a signal on the downlink channel at a power level and/or bit rate which takes into account the determined radio channel characteristics.

According to a third aspect of the present invention there is provided a radio communication system comprising a primary station having transceiving means for transmitting signals on a downlink channel and at least one secondary station having transceiving means for transmitting uplink signals to the primary station on a random access channel, the secondary station having means for determining the prevailing radio channel characteristics of the random access channel and for transmitting these characteristics to the primary station, the primary station having means responsive to the receipt of the radio channel characteristics for determining the power level and/or bit rate of a downlink signal in dependence on the radio channel characteristics.

According to a fourth aspect of the present invention there is provided a secondary station comprising transceiving means for receiving downlink signals from a primary station and for transmitting uplink signals on a random access channel and means for determining the prevailing radio channel characteristics of the random access channel and for transmitting these characteristics to the primary station.

According to a fifth aspect of the present invention there is provided a primary station comprising transceiving means for transmitting signals on a downlink channel to at least one secondary station and for receiving uplink random access channel signals including indicia useable for determining the prevailing radio channel characteristics of the random access channel, and means responsive to the indicia for determining the power level and/or bit rate to transmit downlink signals to the at least one secondary station.

Embodiments of the present invention will now be described, by way of example, with reference to the accompanying drawings, wherein.

In the drawings the same reference numerals have been used to indicate corresponding features.

Figure 1:
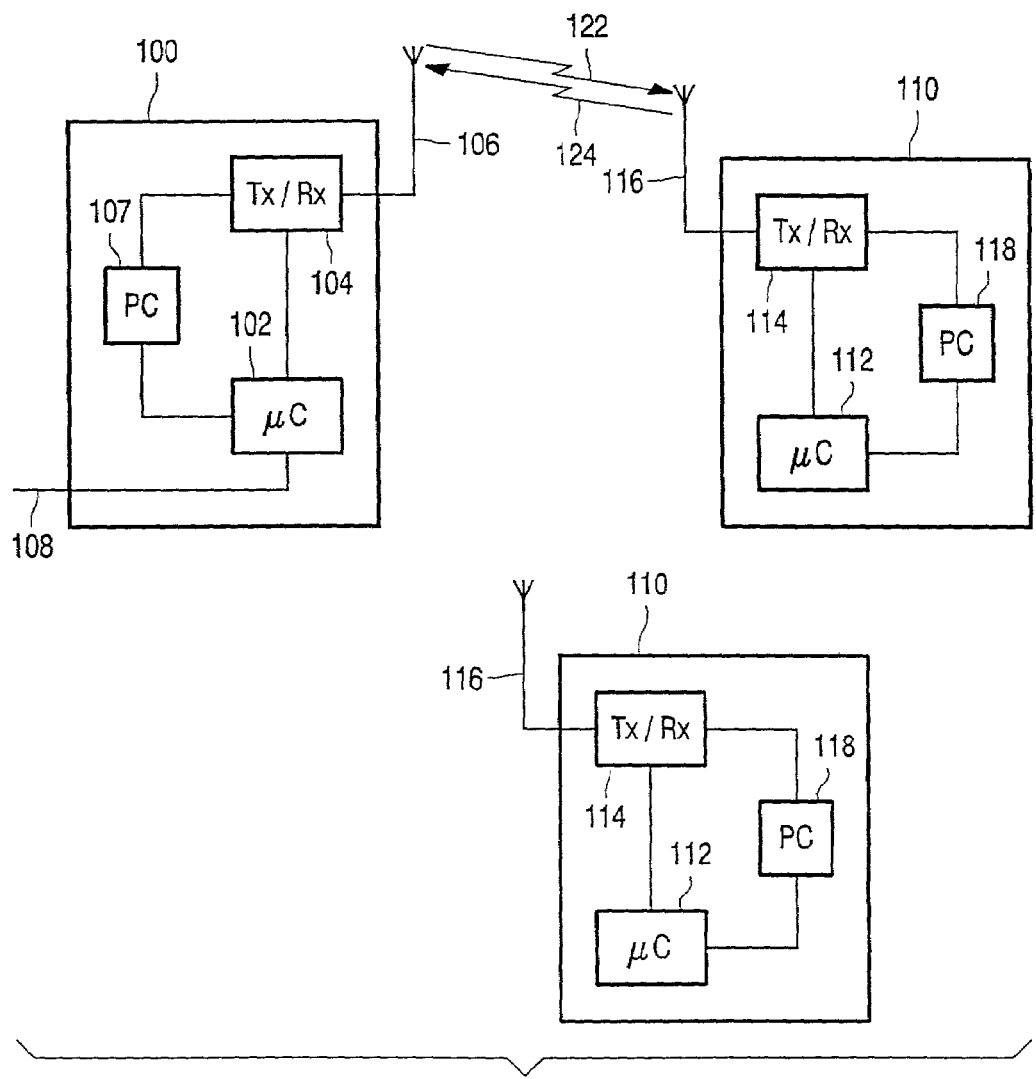
FIG. 1 is a block schematic diagram of a radio communication system.

Referring to FIG. 1, a radio communication system comprises a primary station (BS) 100 and a plurality of secondary stations (MS) 110 which are capable of roaming within the coverage area of the primary station. The BS 100 comprises a microcontroller (μC) 102, transceiver means (Tx/Rx) 104 connected to signal propagating/receiving means, for example an antenna 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to signal propagating/receiving means, for example an antenna 116, and power control means (PC) 118 for altering the transmitted power level. Communication from BS 100 to MS 1 10 takes place on a downlink channel 122, while communication from MS 110 to BS 100 takes place on an uplink channel 124.

In UMTS there are several channels of communication between the primary station 100 and the secondary stations 110. Amongst the non-dedicated channels is the FACH which is a downlink channel from the primary station and which is used for conveying information, including signalling information to individual secondary stations 110, groups of secondary stations or the entire population of secondary stations.

Another non-dedicated channel is a random access channel (RACH) which enables a secondary station to send short messages on the uplink to the primary station. Such short messages may include signalling to the primary station when the secondary station is turned on, sending a packet of data to the primary station when the secondary station may or may not be engaged in a call, and requesting the primary station to allocate a resource, for example a dedicated voice channel, for the secondary station to use.

The FACH downlink channel is often used in conjunction with the RACH uplink channel, whereby a short RACH message is transmitted on the uplink prior to a FACH message on the downlink.

Figure 2:
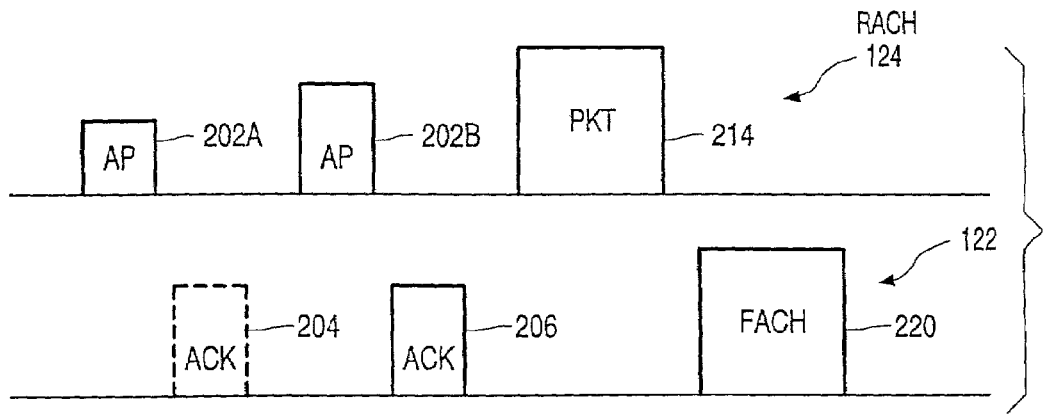
FIG. 2 illustrates signalling on the uplink and downlink channels.

FIG. 2 illustrates a basic scheme of the RACH operating in a CDMA FDD system comprising for convenience of illustration a downlink channel 122 and an uplink RACH 124. The RACH transmission commences with a 1.067 ms Access Preamble (AP) 202A at a power calculated as a function of the estimated downlink path loss and an offset given by the network. If the secondary station does not receive an acknowledgement ACK of the AP 202A, it repeats the AP 202B at a transmit power which is higher than the first power by a predetermined amount set by the network. The secondary station continues to repeat the AP with increasing power until either it is acknowledged or the process is aborted. If the AP 202B is acknowledged 206, the secondary station then transmits a short (10 ms or 20 ms) message PKT at a power higher than that of the last AP 202B by an amount which is predetermined by the network.

The primary station cannot estimate the uplink path loss from the received RACH transmissions because it does not know the value of the downlink path loss which was estimated by the secondary station, nor does it know how many Access Preambles were transmitted.

The primary station is therefore not able to set the initial transmit power of the ensuing FACH message 220 to an appropriate value to compensate for the prevailing path loss.

The method in accordance with the present invention provides a means for the secondary stations 110 to notify the primary station 100 of the downlink path loss or of the transmit power of the RACH transmissions so that the primary station can estimate the downlink path loss and set the initial power of the FACH appropriately. Optionally the primary station 100 may independently control the power of transmitted bits destined for different secondary stations to take into account their respective ranges and path loss.

For RACH, in the case where the transmit power is signalled, in the Access Preamble the downlink path loss could be derived by knowing in addition the number of re-transmissions of the Access Preamble. Here, the power of the first preamble transmission is derived by a pre-determined power offset from the measured downlink path loss and the primary station transmit power, so knowing the power of the first access preamble transmission gives the power loss. This can therefore be derived from the power of the final Access Preamble transmission, knowing the number of re-transmissions and the power step for each one.

In some cases errors may be introduced by fast fading on uplink and downlink, and by measurement or other implementation errors.

Other methods which can be used for determining the radio channel characteristics of the signal path between the primary station 100 and a selected secondary station 110 include (a) the primary station including its transmitted power level in a transmitted downlink message and a secondary station measuring the received signal strength and determining the channel characteristic which can be included in an uplink signal, such as the Access Preamble; (b) as a variant of (a), the secondary station simply includes an indication of the received signal strength in the uplink signal and the attenuation characteristic is determined by the primary station; and (c) the secondary station determines the SIR of a downlink message and relays the determined SIR in a signal such as the Access Preamble or the RACH message part (PKT).

Figure 3:
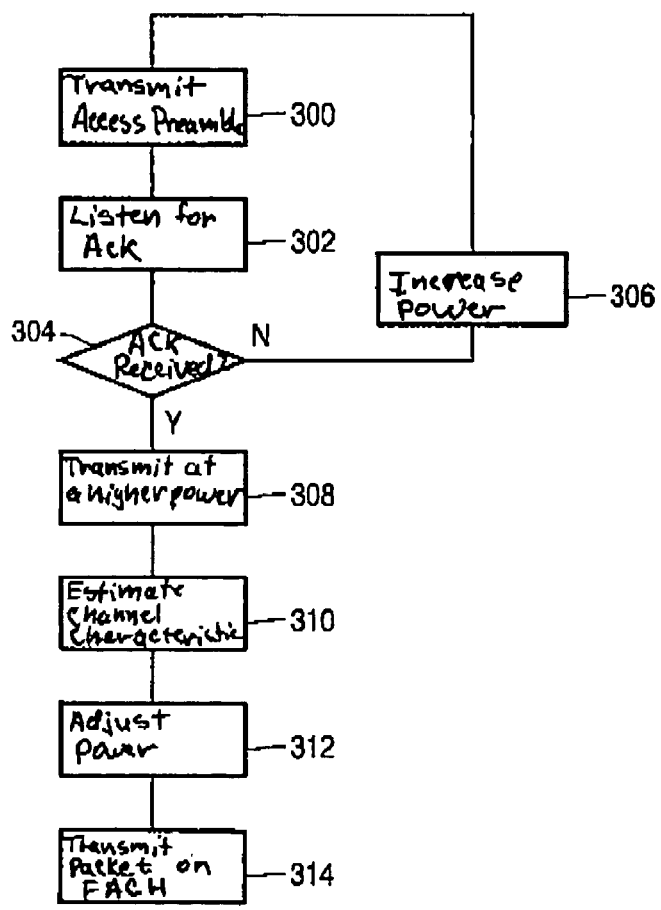
FIG. 3 is flow chart showing the process by which a primary station sets the transmit power on the FACH channel.

FIG. 3 shows a flow chart of the sequence of operations involved in sending and processing the signals shown in FIG. 2. The flow chart begins at block 300 which represents a secondary station 110 transmitting an Access Preamble (AP) at a low power on the RACH. The secondary station then listens on the downlink for an acknowledgement ACK, block 302. Block 304 relates to the secondary station determining if it has received an ACK. If the answer is No (N) then in block 306 the secondary station increases its transmitter power so that in the block 300, the AP is transmitted at a higher power. If the answer is Yes (Y), then in block 308 the secondary station transmits a data packet at a higher power than the successfully received AP. Block 310 denotes the primary station estimating the channel attenuation characteristic which is used in block 312 to adjust its transmitter power. Finally in block 314, the primary station transmits a data packet on the FACH.

Ideally the transmission of one or more of the downlink path loss, initial transmit power, current transmit power or the number of re-transmissions of the AP is carried out in a way which does not add significantly to the signalling overhead of the system.

In the case of UMTS, one or more of the following methods can be used. Firstly signalling in the message part of the RACH, for example in PKT. Secondly offsetting in time each AP by a number of chip periods corresponding to the signalled quantity. Thirdly creating a plurality of access sub-channels, for example 12 random access sub-channels, and selecting one of the access sub-channels according to the signalled quantity. Fourthly assigning a plurality of encoding signatures, for example 16 signatures, to requests on RACH and selecting a particular one of the signatures for the AP according to the signalled quantity.

The choice of sub-channel and/or signature gives up to 196 combinations using the figures given in the previous paragraph. Using time offsets can significantly increase the number of combinations to not only send power/channel information but also other information without adding significantly to the signalling overhead of the system.

Figure 4:
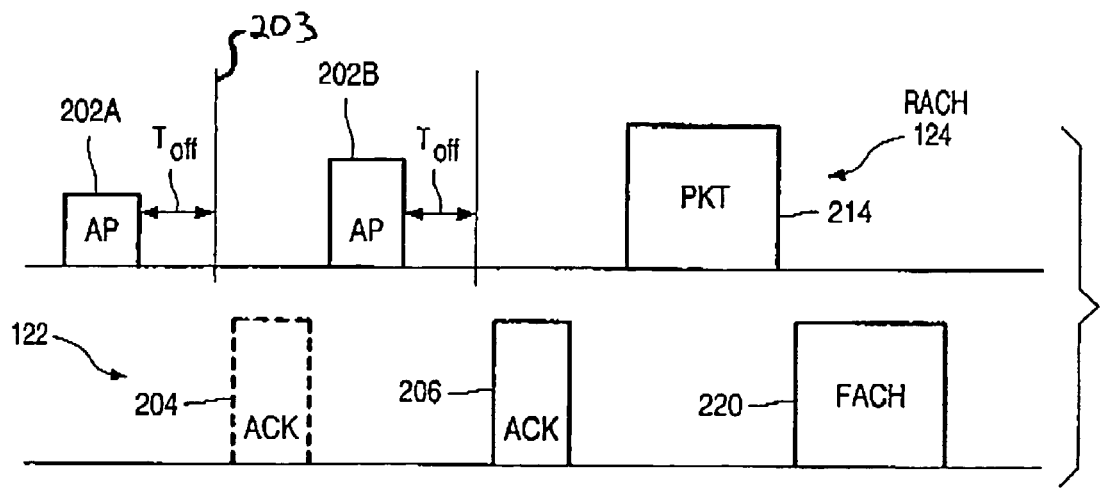
FIG. 4 illustrates an example of using timing offsets for sending power levels/channel attenuation characteristics.

FIG. 4 illustrates one example of how a time offset can be implemented. The time of transmission of the access preamble 202A may be offset by $T_{off}$ with respect to the boundary 203 of the access slot (which is itself defined relative to timing signals transmitted by the BS 100). The access preamble 202A, 202B comprises 4096 chips, while the length of the access slot is 5120 chips. By allowing timing offsets $T_{off}$ of multiples of 256 chips, up to 19 different non-zero values of $T_{off}$ are possible without introducing ambiguity about which slot contained the access preamble 202A, 202B. When $T_{off}=0$ the behaviour of the system is identical to that of a system without the possibility of timing offsets, thereby enabling backwards compatibility with a MS 110 not having the capability to process timing offsets.

The timing offset $T_{off}$ preferably advances the transmission time of the access preambles 202A, 202B since any delay in its transmission might mean that the BS 100 is unable to detect the preamble in time to transmit an access acknowledgement ACK 206 in an appropriate time slot.

It is preferable for there to be no timing offsets in the downlink channels 122, so that the acknowledgement 206 of an access preamble 202A, 202B is the same irrespective of the timing offset used.

The availability of many more signalling combinations (19 times more in the embodiment described here) enables significantly more efficient resource allocation. For example, in the case of channel assignment it enables there to be more bit rates available than the number of signatures. It also reduces the collision probability, which could otherwise be unacceptable if the same bit rate was typically requested by many MSs 110.

The range of the signalled quantity can be quantised into a number of predetermined ranges, depending on the number of time offsets, sub-channels and signatures which are assigned to the notification of the signalled quantity.

In the example case of using different time offsets to send the transmit power (initial or current), two offsets could be used to indicate within which of two ranges the quantity lies, e.g:

| Offset (no of chips) | Transmit power of AP |
|---|---|
| 256 | <−10 dBm |
| 512 | ≧−10 dBm |

Alternatively, sets of offsets could be used to indicate the transmit power level. This method enables the offsets within each set to be used for other signalling:

| Offset (no of chips) | Transmit power of AP |
|---|---|
| 256, 512, 768, 1024, 1280, 1536, 1792, 2048, 2304, 2560, 2816, 3072, 3328, 3585, 3840, 4096, 4352, 4608, 4864 | <−10 dBm ≧−10 dBm |

Similarly, the transmit power could be notified to the primary station more accurately by quantising the transmit power into smaller ranges such as TxPwr<−20 dBm, −20 dBm≦TxPwr<0 dBm, 0dBm≦TxPwr etc.

In another implementation the notification to the primary station of a quantity such as number of re-transmissions or current power of the AP can be performed by increasing, or otherwise adjusting, the time offset of the AP with each subsequent re-transmission.

In a further implementation, the notification to the BS of the measured quantity such as AP transmit power can be performed by means of a small number of signalling bits within the RACH message packet PKT.

A similar procedure could be applied to channels other than the FACH. It could also be applied to the initial power of downlink channels e.g. DPCH or CPCH message part, which are preceded by RACH (or RACH like) access preamble transmissions.

The method in accordance with the present invention may be applied to FDD (frequency division duplex), TDD (time division duplex), CDMA, TDMA and/or CDMA/TDMA/FDMA systems.

Although the specific description refers to adjusting the transmit power of the FACH, the initial bit rate will also be selected together with the transmit power.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of radio communication systems and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of operating a radio communication system that includes a downlink channel for transmissions by a primary station to at least one secondary station and an uplink channel for transmissions from the secondary station to the primary station, the method comprising:
    transmitting a first signal from the primary station on the downlink channel that includes an indication of the transmit power level used for the transmitting,
    determining radio channel characteristics of the downlink channel at the secondary station, based on the indication of the transmit power level,
    transmitting an uplink signal from the secondary station on the uplink access channel giving an indication of the radio channel characteristics, and
    transmitting a signal from the primary station on the downlink channel at a power level and/or bit rate which takes into account the indication of the radio channel characteristics,
    wherein the secondary station:
    retransmits an access preamble signal at successively increasing power levels until an acknowledgement signal is received from the primary station, and
    in response to the receipt of an acknowledgement signal, transmits a message containing an indication of the power level associated with the access preamble signal for which the acknowledgement signal was received.

2. A method of operating a radio communication system that includes a downlink channel for transmissions by a primary station to at least one secondary station and an uplink channel for transmissions from the secondary station to the primary station, the method comprising:

transmitting an uplink signal from the secondary station on the uplink access channel, the uplink signal including an indication of a transmit power level used for the transmitting, determining radio channel characteristics of the uplink access channel at the primary station based on the indication of the transmit power, transmitting a signal from the primary station on the downlink channel at a power level and/or bit rate which takes into account the radio channel characteristics wherein the secondary station:

retransmits an access preamble signal at successively increasing power levels until an acknowledgement signal is received from the primary station,and in response to the receipt of an acknowledgement signal, transmits a message containing an indication of the power level associated with the access preamble signal for which the acknowledgement signal was received.

3. The method of claim 1, wherein the secondary station:

measures a received signal strength associated with the first signal, and determines the radio channel characteristics based on the indication of the transmit power level and the received signal strength.

4. The method of claim 1 or 2, wherein the secondary station retransmits an access preamble signal at successively increasing power levels until an acknowledgement signal is received from the primary station each transmission of the access preamble signal including an indication of its power, and the primary station determines the radio channel characteristics based on the power and the access preamble signal received and acknowledged.

5. The method of claim 1 or 2, wherein the radio channel characteristics include a radio attenuation characteristic.

6. The method of claim 1 or 2, wherein the secondary station:

determines a signal to interference ratio (SIR) of a signal transmitted by the primary station, and includes an indication of the determined SIR in a signal transmitted on the uplink access channel.

7. The method of claim 1 or 2, wherein:

the uplink signal includes a message part of the uplink access channel signal.

8. The method of claim 1 or 2, wherein:

the uplink access channel includes transmission of access preambles by the secondary station, the transmission of an access preamble is offset in time by a number of chip periods corresponding to the radio channel characteristics, and the access preambles are encoded with a selected one of a plurality of signatures, and the selected signature is chosen corresponding to the radio channel characteristics.

9. The method of claim 1 or 2, wherein:

the uplink access channel includes a plurality of access sub-channels, an access sub-channel is selected by the secondary station for the transmission of an access preamble, and the primary station is configured to determine a timing offset and to adjust a subsequent transmit power level based on the timing offset.

10. The method of claim 1 or 2, wherein:

the uplink access channel is a CDMA channel, and the transmission of an access preamble is offset in time by a number of chip periods corresponding to the radio channel characteristic.

11. A radio communication system comprising:

a primary station that includes a first transceiver that is configured to transmit signals on a downlink channel, at least one of the signals including an indication of a transmit power level used to transmit the signal, and at least one secondary station that includes:

a second transceiver that is configured to:

receive the signals from the primary station and transmit uplink signals to the primary station on an access channel, and a measuring device that is configured to determine radio channel characteristics of the downlink channel based on the indication of the transmit power level, wherein at least one of the uplink signals includes an indication of the radio channel characteristics, and the primary station is configured to determine the power level and/or bit rate of subsequent downlink signals in dependence on the radio channel characteristics, wherein the at least one secondary station includes an encoder that is confirmed to transmit access preamble signals as CDMA signals, and to offset in time an access preamble signal by a number of chip periods corresponding to the radio channel characteristics.

12. The system of claim 11 further comprising secondary station comprising:

a transceiver that is configured to receive downlink signals transmitted from a primary station and to transmit uplink signals on an access channel, and a measuring device that is configured to determine radio channel characteristics of the downlink channel, based on an indicator of transmit power from the primary station, and wherein at least one of the uplink signals includes in indicator of the radio channel characteristics.

13. The secondary station of claim 12, including an encoder that is configured to offset in time an access preamble signal by a number of chip periods corresponding to the radio channel characteristics.

14. A primary station comprising:

a transceiver that is configured to:

transmit signals on a downlink channel to at least one secondary station, and receive an uplink access channel signal that includes an indication of a transmit power level associated with the signal, and a measuring device that is configured to determine a power level and/or bit rate to transmit downlink signals to the at least one secondary station based on the indication of the transmit power wherein the uplink signals have CDMA access preamble signals, and the indication has a timing offset of the access preamble signal relative to a reference time, and the primary station is configured to determine the timing offset and to adjust a subsequent transmit power level based on the timing offset.

\* \* \* \* \*